United States Patent
Valentin

(10) Patent No.: US 8,370,858 B2
(45) Date of Patent: Feb. 5, 2013

(54) CREATING STEP DESCRIPTIONS FOR APPLICATION PROGRAM INTERFACES

(75) Inventor: Marco Valentin, Malsch (DE)

(73) Assignee: SAP AG, Walldorf (DE)

( * ) Notice: Subject to any disclaimer, the term of this patent is extended or adjusted under 35 U.S.C. 154(b) by 1090 days.

(21) Appl. No.: 12/333,150

(22) Filed: Dec. 11, 2008

(65) Prior Publication Data
US 2010/0153977 A1    Jun. 17, 2010

(51) Int. Cl.
G06F 3/00     (2006.01)
G06F 13/00    (2006.01)
G06F 9/44     (2006.01)

(52) U.S. Cl. ........................ 719/328; 719/329
(58) Field of Classification Search .......... 719/311, 719/312, 313, 328, 329
See application file for complete search history.

(56) References Cited

U.S. PATENT DOCUMENTS

| | | | |
|---|---|---|---|
| 6,466,971 B1 * | 10/2002 | Humpleman et al. | 709/220 |
| 8,011,014 B2 * | 8/2011 | Bauchot et al. | 726/28 |
| 2003/0200248 A1 * | 10/2003 | Dombrosky et al. | 709/100 |
| 2003/0217176 A1 * | 11/2003 | Beunings | 709/238 |
| 2005/0097511 A1 * | 5/2005 | Bergman et al. | 717/110 |
| 2008/0046834 A1 * | 2/2008 | Yu et al. | 715/771 |
| 2009/0094539 A1 * | 4/2009 | Wang et al. | 715/762 |
| 2009/0204470 A1 * | 8/2009 | Weyl et al. | 705/9 |

* cited by examiner

Primary Examiner — Emerson Puente
Assistant Examiner — Willy W Huaracha
(74) Attorney, Agent, or Firm — Fish & Richardson P.C.

(57) ABSTRACT

Among other disclosed subject matter, a computer program product is tangibly embodied in a computer-readable storage medium and includes instructions that when executed by a processor perform a method for interfacing with an application program. The method includes receiving, from an application program that has an interface, an interface description defining how to make an input into the application program using the interface. The method includes generating a screen for a user to define a step corresponding to a task to be performed in the application program by another user, the screen generated using the interface description. The method includes forwarding a step description for receipt by the application program, the step description created using a definition made under guidance of the screen, and configured consistently with the interface for the application program to create the task.

21 Claims, 3 Drawing Sheets

CREATING STEP DESCRIPTIONS FOR APPLICATION PROGRAM INTERFACES

TECHNICAL FIELD

This document relates to interface communication.

BACKGROUND

An application program may include a list of tasks for a user of the application program to perform. For example, such a task list may contain hundreds of steps informing the user how to upgrade a computer system. Several different users of several different application programs may desire to upgrade similar computer systems. Many of the tasks may be common to all the users. Recreating the common tasks in the different application programs may be time consuming.

An application program may include an interface permitting an input of a definition for a task. Creating the definition for the task, however, may require specialized knowledge of a technical language of the input or a form for content of the input. Individuals able to understand such specialized knowledge may not be informed about a subject matter of the task to be created. Thus, more than one individual may be required to create an input for the application program. Additionally, errors in the input may not be handled well by the application program. A tool enabling an individual to create an input without such specialized knowledge may work with few different application programs.

SUMMARY

The invention relates to creating step descriptions for application programming interfaces.

In a first aspect, a computer program product is tangibly embodied in a computer-readable storage medium and includes instructions that when executed by a processor perform a method for interfacing with an application program. The method includes receiving, from an application program that has an interface, an interface description defining how to make an input into the application program using the interface. The method includes generating a screen for a user to define a step corresponding to a task to be performed in the application program by another user, the screen generated using the interface description. The method includes forwarding a step description for receipt by the application program, the step description created using a definition made under guidance of the screen, and configured consistently with the interface for the application program to create the task.

Implementations can include any or all of the following features. The method can further include, in response to receiving the interface description, modifying the interface description according to received user input, and the screen can be generated using the modified interface description. The definition can be restricted to a form identified by the received user input. The method can further include verifying a validity of the definition, wherein the verifying includes forwarding at least a portion of the definition to the application program for comparison to a plurality of valid definitions, and in response receiving from the application program an indication of the validity of the definition. The plurality of valid definitions can include customer entered data. The method can further include receiving a request by the user indicating that the step description is to be created for the application program, wherein the interface description is received in response to the request. The method can further include transmitting at least a portion of the interface description to the application program for an assessment of whether the interface description is up to date. The request can specify the application program from a plurality of application programs that are capable of transmitting an interface description and receiving a forwarded step description configured consistently with the transmitted interface description. The method can further include storing the definition for use as a proposed definition during a subsequent generation of a screen using an interface description from the application program. The interface description can define an interface field identifier, the step description can include an Extensible Markup Language (XML) tag that includes the interface field identifier, and the step description can include an XML field that corresponds to the XML tag and includes the definition. The interface description can restrict a form of the definition. The interface description can restrict the definition to definitions provided by the interface description. The task to be performed in the application program can be manually performed by the other user and can be from a plurality of tasks arranged in a tree structure.

In a second aspect, a computer program product is tangibly embodied in a computer-readable storage medium, the computer program product including instructions that, when executed, generate on a display device a graphical user interface for defining a step corresponding to a task to be performed in an application program that has an interface. The graphical user interface includes a step definition field for receiving a definition, the step definition field requested by an interface description that defines how to make an input into the application program using the interface, the interface description received from the application program. The graphical user interface includes a user-selection device for initiating a forwarding of a step description for receipt by the application program, the step description created using the definition and configured consistently with the interface for the application program to create the task.

Implementations can include any or all of the following features. The interface description can restrict a form of the definition. The interface description can restrict the definition to definitions provided by the interface description.

In a third aspect, a generic maintenance tool includes an input for receiving, from an application program that has an interface, an interface description defining how to make an input into the application program using the interface. The generic maintenance tool includes a screen generating component for generating a screen for a user to define a step corresponding to a task to be performed in the application program by another user, the screen generated using the interface description. The generic maintenance tool includes an output for forwarding a step description for receipt by the application program, the step description created using a definition made under guidance of the screen, and configured consistently with the interface for the application program to create the task.

Implementations can include any or all of the following features. The output can be operable to forward the definition to the application program for comparison to a plurality of valid definitions, and the input can be operable to in response receive from the application program an indication of a validity of the definition. The generic maintenance tool can further include a user-input terminal for receiving a request by the user indicating that the step description is to be created for the application program, wherein the interface description is received in response to the request, and the request specifies the application program from a plurality of application programs that are capable of transmitting an interface description and receiving a forwarded step description configured consistently with the transmitted interface description. The interface description can define an interface field identifier, the step description includes an Extensible Markup Language (XML) tag that includes the interface field identifier, and the step description includes an XML field that corresponds to the XML tag and includes the definition.

The described subject matter may provide for one or more benefits, such as enabling a use of a single tool with a two-way interface for creating tasks in different application programs. Further, a single individual may define a task for an application program without knowing a technical language accepted by an interface for the application program. Nor may a user need to know a specific content acceptable to the interface or the application program. Users may be assured that a description of a task (a step description) will contain no errors.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes examples for creating a step description configured for input into an interface of an application program. In some implementations, a generic maintenance tool may receive an interface description from the application program. The interface description may define how to make an input into the interface of the application program and request definitions to be supplied by a user of the generic maintenance tool. The generic maintenance tool may process the received interface description and display a screen to the user to define a step by supplying the requested definitions. Using the interface description and any user-supplied definitions, the generic maintenance tool may generate an output file containing the step description. The step description may be input to the application program via the interface to create a task to be performed by another user of the application program.

Figure 1:
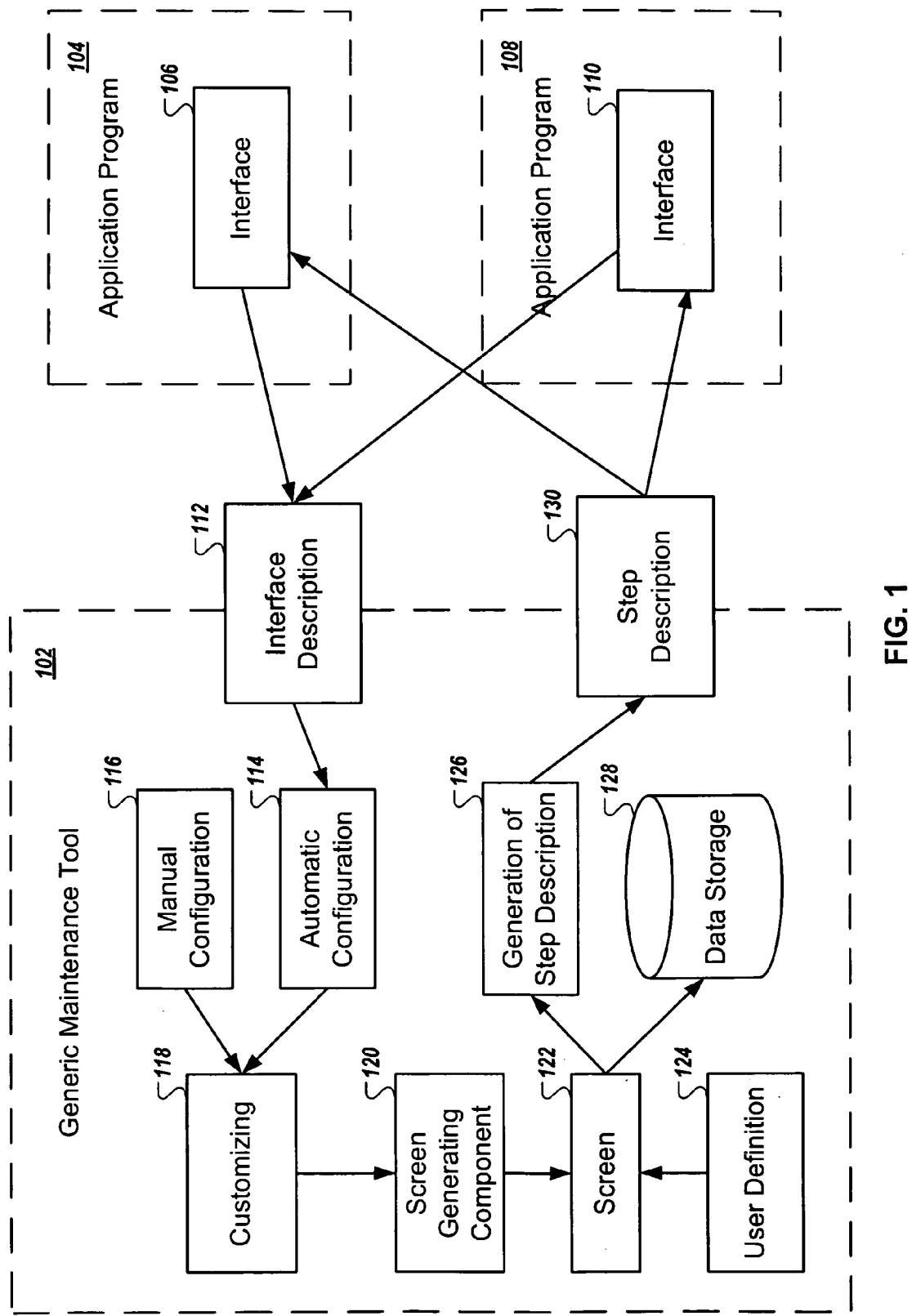
FIG. 1 is a block diagram schematically representing a creation of a step description for an application program.

FIG. 1 is a block diagram schematically representing a creation of a step description 130 for an application program 104. In some implementations, a generic maintenance tool 102 may permit users of the maintenance tool 102 to create the step description 130 for input to an application program 104 for the creation of a task in a task list. The task list, which may be contained in the application program 104, may include a plurality of tasks to be performed by the application program 104 or a user of the application program 104. By way of illustration, the task list may identify hundreds of tasks necessary to upgrade a software system. The tasks may include: (1) getting the latest version of a target release kernel, (2) freeing space in a particular directory, and (3) installing the target release kernel, to name just a few examples. In some implementations, one or more tasks can be added to the application program 104 using the generic maintenance tool 102.

In various implementations, some of the tasks from in the task list are ordered. For example, the task list may indicate that the user should get the latest version of the kernel before freeing space in the particular directory. Freeing space in the directory may be dependent upon getting the kernel. Additionally, the task list may be ordered in a tree structure. For instance, the task asking the user to free space in a particular directory may be a parent task (or node) of a child task requesting that the user install the target release kernel. The child task may be dependent upon a processing of the parent task.

In other implementations, some of the tasks are performed automatically by the application program 104. An automatically performed task may perform upon completion of a predecessor task. For example, the application program 104 may monitor free space in the particular directory and automatically install the kernel when the space is free. In contrast, the application program 104 may automatically install the kernel upon the user indicating that a predecessor task is completed (e.g., clicking a "complete" button) or upon indicating the automatic process should be performed (e.g., clicking an "execute" button). A successor task may automatically perform upon completion of an automatically performing predecessor task.

In some implementations, the task list may be displayed to the user in a graphical user interface. Each task may be displayed as a node of a tree structure and may show a synopsis of the task to perform, display an ordering of the task, show a priority of the task, indicate a status of the task, display notes associated with the task, etc. In other implementations, the task list information may be used by a separate graphical user interface to present information to the user (e.g., through a step-by-step wizard where each step may correspond to a specific task).

Task lists may take forms or describe content other than the above described illustration for upgrading a software system. For example, a task list may indicate tasks performed to close a financial period in a business. Some of the tasks may be manually performed in a computer system (e.g., finalizing all accounts), some may be automatically performed in the computer system (e.g., calculating appropriate taxes), and some tasks may be manually performed without the computer system (e.g., sending a previous period's financial records to a warehouse). In another example, the task list represents a procedure including a planning of labor and materials use. The procedure may direct labor and materials use for plant maintenance (e.g., an ongoing cycle of manufacturing products) or a one-time project (e.g., a building of a bridge).

In some implementations, the application program 104 may be included in an Enterprise Resource Planning (ERP) system or a module of an ERP system. In various implementations, some tasks are standard to several different groups of users of an application program (e.g., different companies that use a same software system may perform standard tasks to upgrade the software system). Other tasks may be unique to a specific group of users of an application (e.g., one company upgrading a software system may free space in a different directory). The generic maintenance tool 102 may provide a mechanism for a user of the maintenance tool 102 to create such unique tasks.

The application program 104 may include an interface 106 for receiving an input to the application program 104. The input may be for creating a task for addition to a task list or for a creation of a new task list. The interface 106 may permit the application program 104 to interact with the generic maintenance tool 102 through an agreed upon set of functions, procedures, methods, classes, or protocols. The interface 106 may be computer language dependent or independent. In some implementations, the interface 106 may be an open XML interface capable of receiving as input an XML file. A received XML file may contain a step description 130 for a creation of a task by the application program 104.

A user of the generic maintenance tool 102 may use the maintenance tool 102 to define a step description 130 for input into the interface 106. In various implementations, the step description 130 contains specific content and is in a specific form for input by the interface 106. The generic maintenance tool 102 may receive from the application program 104 or the interface 106 an interface description 112 (in this sense the interface 106 may be considered a two-way interface). The interface description 112 may be created by the application program 104 and define or indicate how to make an input into the application program 104 using the interface 106. Accordingly, the maintenance tool 102 may perform a guided creation of the step description 130 utilizing user-supplied definitions. The generic maintenance tool may include a two-way interface for receiving the interface description 130 and forwarding the step description 130.

The application program 104 or the interface 106 may require a customizing to output the interface description 112. The customizing may be adjustable, and an adjustment to the customizing may lead to a corresponding adjustment in the interface description 112. In some implementations, the user of the generic maintenance tool 102 and the user of the application program 104 are different individuals. The generic maintenance tool 102 may be a software application distinct from the application program 104.

In various implementations, the interface description 112 may request definitions to be supplied by the user of the generic maintenance tool 102. Each definition may specify information ultimately used to define a step description and create a task. For example, the interface description 112 may request a step name for the step description 130 and a type of step in the step description 130 (e.g., a remark, a reminder, a manual action, an automatic action, etc.).

The interface description 112 may restrict how a definition is supplied by a user of the maintenance tool 102. For example, interface may request that the step name is entered via a text box and that the type of task is entered via a drop down list. A graphical user interface corresponding to screen 122 is described in more detail below.

The interface description 112 can restrict a form of a definition. For example, the interface 106 may only be operable to receive step names that are 50 characters or shorter. The application program 104 may accordingly transmit an interface description 112 that restricts definitions to 50 characters in length. Form restrictions may include a length of the definition, a content of the definition, an encoding of the definition, etc.

The interface description 112 may include an interface field identifier. The maintenance tool 102 may include the interface field identifier from the interface description 112 in the step description 130 to identify to the interface 106 a user definition. For example, the interface description 112 can include interface field identifier "step name" that may accompany a corresponding definition in the creation of the step description 130. In this way, the interface 106 is able to identify the requested user definition out of all of the information in the step description. The interface field identifier may include any of the previously discussed information or any information in the interface description 112. The interface field identifier may be an XML tag.

The interface description 112 may include provided definitions. For example, three provided definitions may accompany a requested "step type" definition: (1) a reminder, (2) manual task, and (3) an automatically initiated computer program provided definition. These provided definitions may be displayed to the user of the maintenance tool 102 as an option for the requested definition. In some implementations, the requested definition may be restricted to one of the provided definitions.

In various implementations, the requests and restrictions of the interface description may be provided in a file, a stream of information, or a signal received from the application program 104. In some implementations, the interface description 112 is an XML file and the requests and restrictions of the interface description are contained within tags, fields, and other components of the XML file.

The interface description 112 may be received by the generic maintenance tool 102 for automatic configuration 114 and customizing 118 to enable a receipt of a user definition 124 in a screen 122. The automatic configuration 114 may indicate an input into the generic maintenance tool 102 for the interface description 112.

In some implementations, the generic maintenance tool 102 may provide a customizing 118. The customization may be simple. For example, the interface description 112 may be XML language formatted similar to XML language of the step description 130, only absent one or more user-supplied definitions. In this instance, the customizing 118 may extract appropriate information for use by the screen generating component 120 to display on a screen 122. In some implementations, the manual customizing can be done to adapt the automatic configuration by the last 5% that are specific to the particular customer.

The customizing 118, however, may be quite complex. For example, the customizing 118 may combine the information of the interface description 112 with a manual configuration 116 (discussed later). Further, the interface description 112 may contain only some of the information necessary to create the step description 130. In such case, the customizing 118 may use data stored by the generic maintenance tool 102 to assist in the creation of the step description 130 (along with any user definitions). In some implementations, the customizing 118 processes the information of the interface description 112 into a form readable by the screen generating component 120 for generating a screen 122 in conformance with the interface description 112.

The screen generating component 120 may be a module for generating a screen 122 for display to the user of the maintenance tool 102. The screen generating component 120 may include software modules or engines for generating a graphical user interface (e.g., an Internet browser or an operating system application or graphic rendering engine). In some implementations, the screen generating component 120 may be independent from the maintenance tool 102. In other implementations, the screen generating component 120 may be an interface to an external screen generating component and an external screen.

The screen 122 may be presented to the user of the maintenance tool 102 for receipt of a user definition 124. The screen 122 may be the screen generated by the screen generating component 120 (e.g., a window of an Internet browser, a window of an operating system or an application therein, or the external screen of the external screen generating component). In various implementations, definitions requested by the interface description 112 may be input under guidance of the screen 122. For example, the interface description 112 may request a step name definition, specify that this definition should be entered in a text box, and restrict the definition length to 50 characters. The user of the maintenance tool 102 may type "Sample Step Name" into an appropriate text box created by the screen generating component 120 and displayed on the screen 122. In another example, the interface description 112 may have requested a step type definition, specified that this step type is selected in a pull down menu, and offered three provided definitions for selection by the user of the maintenance tool 102. The screen 122 may display an appropriate pull down menu.

In various implementations, the generic maintenance tool 102 may verify a validity of a user definition during run-time. For example, the screen 122 may present a text box for entering a bank account number associated with a specific customer of a company that uses the application program 104. The generic maintenance tool 102 may forward the definition entered by the user (e.g., the bank account number), along with a definition identifier (e.g., an interface field identifier) to the application program 104. The application program 104 may compare the definition against a list or a database of valid definitions (e.g., "foreign keys" that represent valid bank account numbers). In response, the generic maintenance tool 102 may receive an acknowledgement signal or an indication of definition validity from the application program 104.

In various implementations, the plurality of valid definitions includes customer entered data. For example, the application program may be used by a company that stores information on customers. The plurality of valid definitions may include information entered into the application program by customers (e.g., via a web site or terminal made available to the customer by the company). The customer entered data may also include information entered about the customers. For example, it may contain information about a customer's purchasing history, address, financial information, etc.

In other implementations, the generic maintenance tool 102 performs the validity check itself or forwards the definition to an application or a database other than the application program 104. The interface description 112 may include a reference structure identifier that identifies the application program or system to perform the validity check.

The maintenance tool 102 may generate 126 or create a step description 130 configured consistently with the interface 106. The generation of the step description 126 may incorporate a definition 124 and at least some of the information from the interface description 112. In some implementations, the step description 124 is an XML file that contains XML start and end tags and corresponding fields within each start and end tag. The interface field identifier may define a content of an XML tag and a definition may define a content of a corresponding field (e.g., <field_identifier>definition</field_identifier>).

In various implementations, the restrictions on form and content provided by the interface description 112 are not included in the step description 130 (e.g., the restrictions are used in the generation of the screen 122 and then discarded). In some implementations, the step description 130 contains information on more than one user-defined step. The generation 126 of the step description may represent an output for forwarding the step description 130 for receipt by the application program 104. The step description 130 may be forwarded directly to the interface 106 of the application program 104 as a stream of information or a signal or may be saved as a file that the interface 106 is capable of processing. Directing the step description 130 to the application program 104 may protect against unauthorized reading or changing of the step description 130.

In some implementations, the generic maintenance tool 102 may provide a manual configuration 116 that may receive user input. The manual configuration 116 may permit an administrator or a user of the generic maintenance tool 102 to modify the customizing 118 so that the screen 122 displays information or receives definitions differently than if the interface description 122 operated within the maintenance tool 102 without intervention.

For example, the interface description 122 may request a definition for a username and place limits on the username's form (e.g., the username must be greater than 8 characters but less than 30). The manual configuration 116 may permit the administrator to restrict a corresponding user definition 124 to include at least one number and at least one letter. The customizing 118 may reconcile the manual configuration with the automatic configuration 114 (presented by the interface description 112) and provide appropriate information to the screen generating component 120 for the generation of the screen 122. Thus, an administrator of the generic maintenance tool 102 may ensure that all users that define steps for a particular application program enter username that meet the specific criteria.

A manual configuration 116 may be specific to a certain application program, a certain step, or certain content within an interface description. One skilled in the art would recognize the numerous possibilities for modifying the automatic configuration with the manual configuration (e.g., adding definitions that are not requested by the interface description 112, offering additional provided definitions not offered by the interface description 112, etc.). The manual configuration 116 may permit the user to create an interface description without a receipt of the interface description 112.

In some implementations, a data storage 128 stores a user definition 124. The stored user definition may be used as a proposed definition during a subsequent generation of a screen 122 in a creation of a step description 130. In other implementations, the data storage 128 stores data on interface descriptions 112 that have been received by the generic maintenance program 102.

In various implementations, the generic maintenance tool 102 is operable to interact with application programs other than application program 104 (and interfaces other than interface 106). The other application programs may, similar to application program 104, transmit an interface description 112 to the generic maintenance tool 102 and receive a step description 130 from the maintenance tool 102. For example, the application programs may be application programs provided by different software vendors. A user may use the generic maintenance tool 102 to create a step description 130 for a task in the application program 104 at a first company and use the same generic maintenance tool to create a step description for a different task in a different application program 108 at a second company. The application programs 104 and 108 may also be application modules with different interfaces for a shared ERM system. The above discussion on operation of the application program 104 and the interface 106 may apply to the application program 108 and interface 110.

In some implementations, the generic maintenance tool 102 receives a request from a user of the maintenance tool 102 indicating that an interface description 112 is to be received from a specified application program. In response, the interface description 112 is received from the specified application program. The request may contain an identifier of the specific application program. For example, a user of maintenance tool 102 may request that application program 108 provide an interface description 112. In some implementations, the customizing 118 and the generation of the screen 120 occur in response to receipt of the interface description 112.

In other implementations, the requested interface description is stored by the generic maintenance tool 102 until a different request is received to generate a step description for the corresponding application program. In such implementation, the maintenance tool 102 may check if the stored interface description is up-to-date before receiving the user definition 124 and generating 126 the step description 130. For instance, the maintenance tool 102 may transmit a portion of the stored interface description (e.g., a header of the file, a time stamp, a checksum, a portion of the substantive description, etc.) to the application program 108. Using the transmitted portion, the application program 108 may assess whether the stored interface description is up-to-date. If the stored interface description is not up to date a new interface description may be transmitted by the application program 108 to the maintenance tool 102. If the stored interface description is up-to-date, the application program may do nothing or may send a validity indicator to the tool 102.

Figure 2:
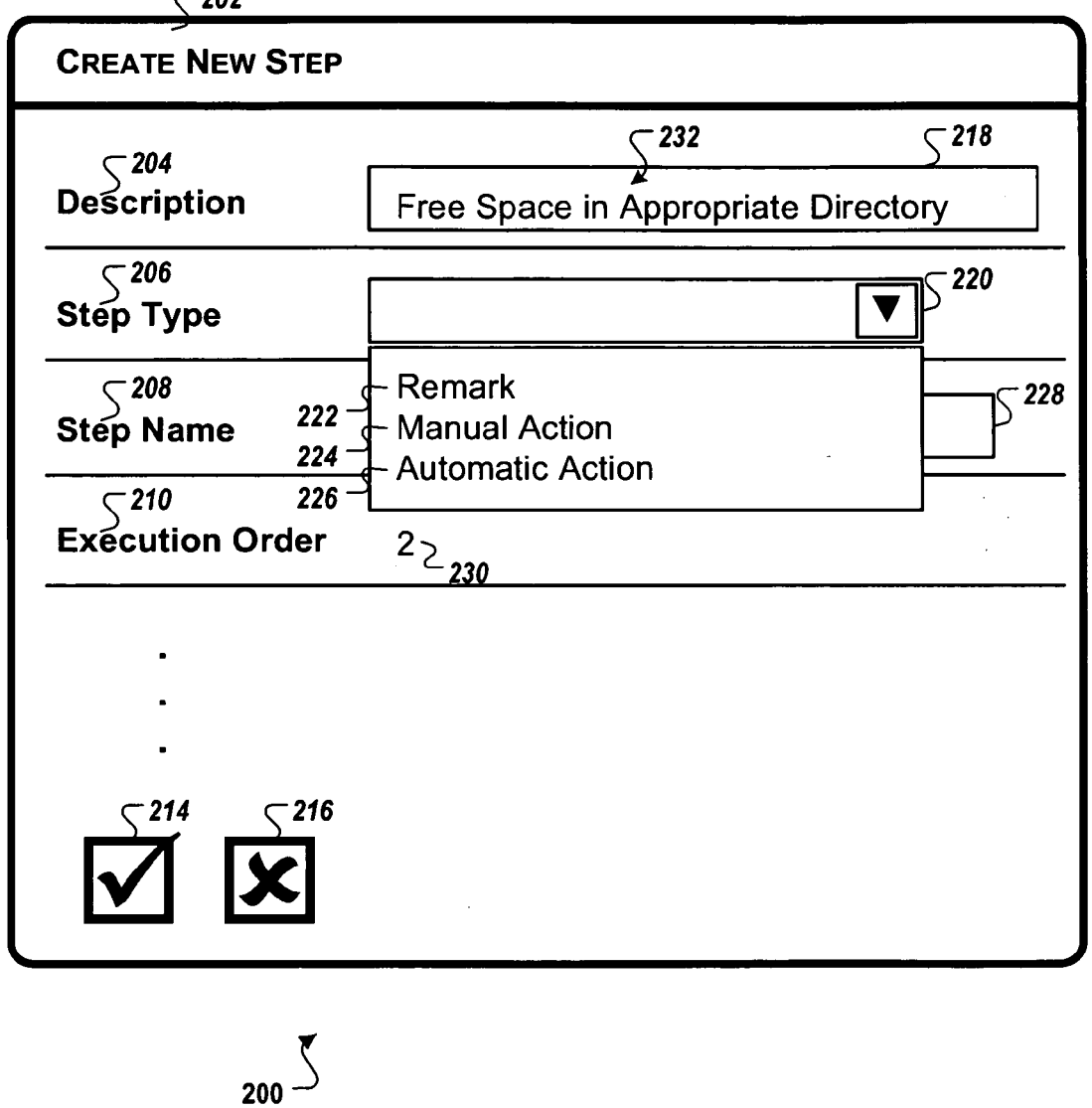
FIG. 2 is an example screen for creating a step description.

FIG. 2 is an example screen for creating a step description. In some implementations, the screen 200 can include or be included in the screen 122 of FIG. 1. The screen 200 may be displayed to the user of the generic maintenance tool 102 to create the step description 130. The screen 200 includes step definition fields 218, 220, and 228 for receiving definitions supplied by the user. The labels 204, 206, and 208 identify the fields 218, 220, and 228 to the user. Title 202 identifies the screen 200 to the user of the maintenance tool 102. For instance, the title may identify that the user is creating a new step or may identify the application program (e.g., application program 104 or 108) that the new step is to be created for.

In some implementations, the screen 200 may present a text box 218 to the user for receiving a definition 232 (e.g., the user can type or otherwise input the definition into the text box 218). The interface description 112 may contain information restricting or identifying that the definition 232 should be input via the text box 218. In some implementations, a definition input into the text box 218 may be restricted by the interface description 112. For example, the interface description 112 may indicate that the definition 232 must be capital letters. The text box 218 may appropriately limit the definition to capital letters.

A label 204 may accompany the text box 218. The label 204 may identify to the user the definition to be entered into the text box 218. For example, the user knows to enter a "Description" in the text box 218 for the step he is creating. In some implementations, the label 204 is supplied by the interface description 112. The label 204 may be the interface field identifier discussed previously (or may be associated with the interface field identifier). In other implementations, a manual configuration 116 identifies the label to accompany specific step definition fields.

In some implementations, the screen 200 includes a pull down menu 220. Like the text box 218, the pull down menu 220 may be identified by the interface description 112 for receiving a definition. The pull down menu 220 may offer provided definitions 222, 224, and 226 for selection by the user. The provided definitions may be provided by the interface description 112, the manual configuration 116, or by the maintenance tool 102. The provided definitions may be the stored definitions stored in the data storage 128. The provided definitions may be exclusive definitions available for selection by the user or may be optional definitions (e.g., the user may not choose any of the provided definitions and instead type in the pull down menu box like with the text box 218). The pull down menu may be associated with a label 206 that is similar in function and description to the label 204.

In some implementations, the screen 200 may include a text box 228 similar to the text box 218 except for a definition and a form of the definition (e.g., the text box 228 may restrict the definition to a shorter length). The screen 200 may include a pre-specified definition 230. The interface description may request that the screen 200 display the pre-specified definition 230 to the user for informational purposes. In other implementations, the pre-specified definition 230 may be requested by the interface description 112 like other definitions, but the manual configuration 116 may override the request and supply a standard definition. Definitions 228 and 230 may be associated with labels 208 and 210, respectively.

In various implementations, a definition included in the step description 130 may include part of the definition 232 or, to the contrary, may include information in addition to the definition 232. The screen 200 is an example screen, as additional components and definition input devices may be presented. Examples of other labels and their corresponding definitions (and respective descriptions) may include: Execution Type (may define the type of step in the step description 130), Dependency (may define the dependency relative to other steps or tasks), Execution Phase (may define if a task is to be done before or after the upgrade), Execution Runtime (may define if a task runtime is small, medium, or high), and the SAP-specific labels SAP R/3 Release From, SupportPackLevelFrom, SAP R/3 Release To, SupportPackLevel To, Component ID, Software Component, Note Number, and Execution Client.

Another example label and corresponding definition may include an execution order (e.g., label 210 and definition 230). The execution order may define an importance of a task. In some implementations, the application program 104 may sort the tasks by this order. For example, a task created using the definitions of screen 200 may include an execution order 230. The created task may be performed before a task with an execution order 99 and after a task with an execution order 0.

The screen 200 may include a user-selection device 214 for initiating a forwarding of a step description for receipt by the application program. For example, after the user enters definitions into or selects definitions for appropriate definition input devices, he may select the user-selection device 214 (e.g., click on the button 214) to generate 126 a step description 130 with the entered definitions. The application program 104 may input the generated step description 130 using the interface 106. The screen 200 may include a user-reset device 216 for resetting the definition input devices to an original state.

Figure 3:
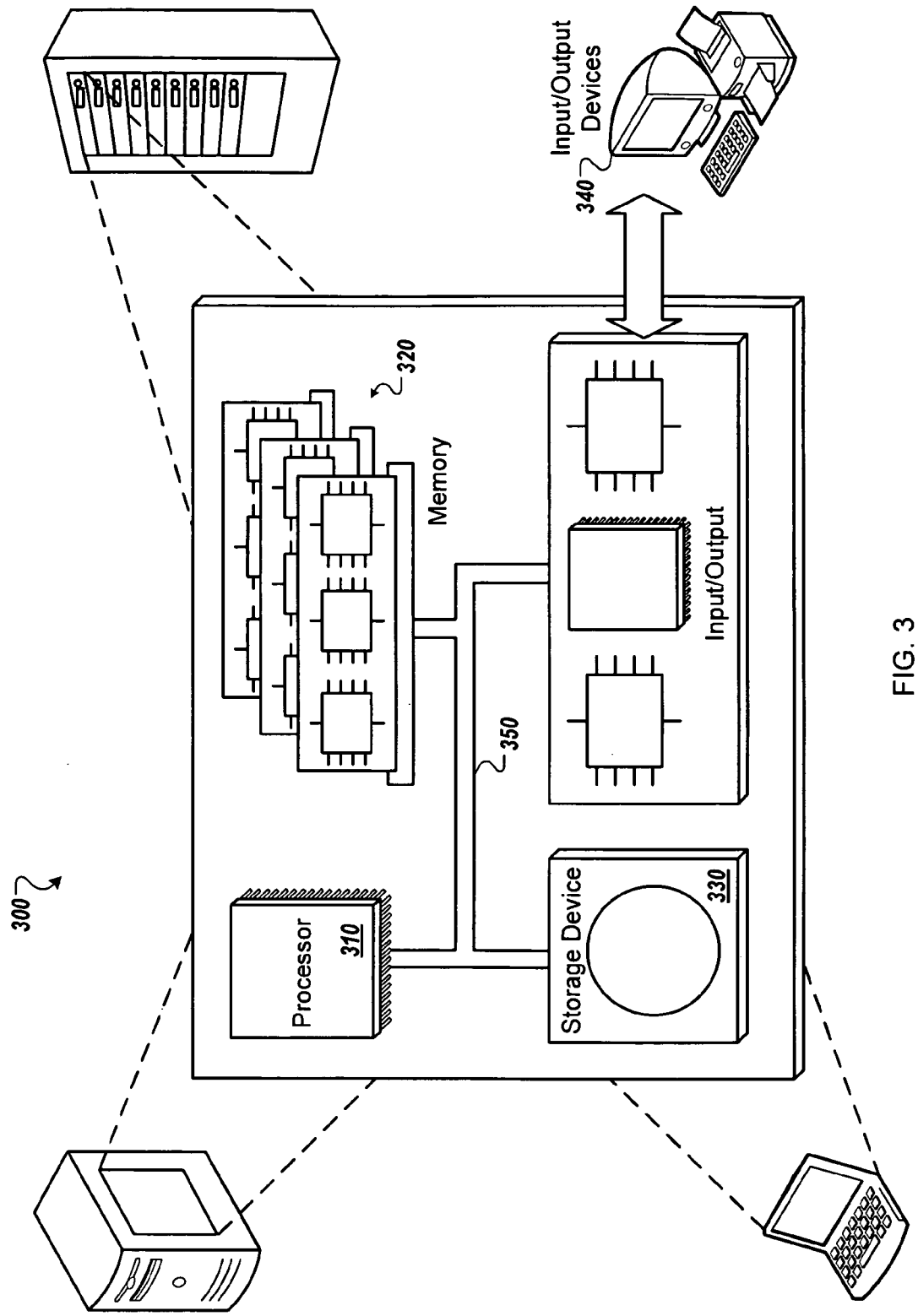
FIG. 3 is a block diagram of a computing system that can be used in connection with computer-implemented methods described in this document.

FIG. 3 is a schematic diagram of a generic computer system 300. The system 300 can be used for the operations described in association with the schematic block diagram in FIG. 1 or the screen 200 in FIG. 2, according to one implementation. The system 300 includes a processor 310, a memory 320, a storage device 330, and an input/output device 340. Each of the components 310, 320, 330, and 340 are interconnected using a system bus 350. The processor 310 is capable of processing instructions for execution within the system 300. In one implementation, the processor 310 is a single-threaded processor. In another implementation, the processor 310 is a multi-threaded processor. The processor 310 is capable of processing instructions stored in the memory 320 or on the storage device 330 to display graphical information for a user interface on the input/output device 340.

The memory 320 stores information within the system 300. In one implementation, the memory 320 is a computer-readable medium. In one implementation, the memory 320 is a volatile memory unit. In another implementation, the memory 320 is a non-volatile memory unit.

The storage device 330 is capable of providing mass storage for the system 300. In one implementation, the storage device 330 is a computer-readable medium. In various different implementations, the storage device 330 may be a floppy disk device, a hard disk device, an optical disk device, or a tape device.

The input/output device 340 provides input/output operations for the system 300. In one implementation, the input/output device 340 includes a keyboard and/or pointing device. In another implementation, the input/output device 340 includes a display unit for displaying graphical user interfaces (e.g., the screen 200).

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of this disclosure. Accordingly, other embodiments are within the scope of the following claims.

What is claimed is:

1. A computer program product tangibly embodied in a non-transitory computer-readable storage medium and comprising instructions that, when executed by a processor, cause the processor to perform a method for interfacing with an application program, the method comprising:
receiving, by a maintenance tool and from an application program that has an interface and that is configured to display a list of steps that are to be performed by a user of the application program, an interface description defining how to use the interface to input, into the application program, a step description that defines a step that is to be added to the list of steps,
wherein the interface description specifies that a step name and a type of step are to be defined for the step,
wherein the application program is included in an enterprise resource planning system or a module of an enterprise resource planning system;
generating, by the maintenance tool and using the interface description that was received from the application program, a screen that enables a user of the maintenance tool to define at least the step name and the type of step;
receiving, by the maintenance tool, user input that defines the step name and the type of step;
generating, by the maintenance tool and based at least in part on the received user input that defines the step name and the type of step, the step description; and
forwarding, by the maintenance tool, the step description for receipt by the application program so as to cause the application program to add the step to the list of steps and
display the added step, the step being defined according to the received user input that defines the step name and the type of step, the display of the step including a display of the step name that was defined by the user input.

2. The computer program product of claim 1, further comprising: in response to receiving the interface description, modifying the interface description according to received user input, and wherein the screen is generated using the modified interface description.

3. The computer program product of claim 2, wherein the received user input is restricted to a form identified by the received user input.

4. The computer program product of claim 1, further comprising: verifying a validity of the user input that defines the step name or the type of step by forwarding, by the maintenance tool, the step name or the type of step to the application program for comparison to a plurality of valid step names or types of steps, and in response receiving, by the maintenance tool and from the application program, an indication of the validity of the of the step name or the types of steps.

5. The computer program product of claim 4, wherein the plurality of valid step names or types of steps includes customer entered data.

6. The computer program product of claim 1, further comprising: receiving a request by the user indicating that the step description is to be created for the application program, wherein the interface description is received in response to the request.

7. The computer program product of claim 6, further comprising: transmitting at least a portion of the interface description to the application program for an assessment of whether the interface description is up to date.

8. The computer program product of claim 6, wherein the request specifies the application program from a plurality of application programs that are capable of transmitting an interface description and receiving a forwarded step description configured consistently with the transmitted interface description.

9. The computer program product of claim 1, further comprising: storing the defined step name or type of step for use as a proposed step name or type of step during a subsequent generation of a screen using an interface description from the application program.

10. The computer program product of claim 1, wherein the interface description defines an interface field identifier, the step description includes an Extensible Markup Language (XML) tag that includes the interface field identifier, and the step description includes an XML field that corresponds to the XML tag and includes the definition.

11. The computer program product of claim 1, wherein the interface description restricts a form of the user input that defines the step name or the type of step.

12. The computer program product of claim 1, wherein the interface description restricts the step name or the type of step to step names or types of steps provided by the interface description.

13. The computer program product of claim 1, wherein the step to be performed by the user of the application program is manually performed by the user of the application program and is from a plurality of steps arranged in a tree structure.

14. A computer program product tangibly embodied in a non-transitory computer-readable storage medium, the computer program product including instructions that, when executed by a processor, cause the processor to perform operations that comprise:
generating, on a display device and by a maintenance tool, a graphical user interface that enables a user of the maintenance tool to define a step that is to be displayed by an application program as part of a list of steps that are to be performed by a user of the application program, the application program having an interface, the application program being included in an enterprise resource planning system or a module of an enterprise resource planning system;
the graphical user interface comprising:
a step name field for receiving user input that defines a step name, the step name requested by an interface description that defines how to make an input into the application program using the interface, the interface description received from the application program, the interface description specifying that the step name is to be defined for the step,
a step type field for receiving user input that defines a step type, the step type requested by the interface description, the interface description specifying that the step type is to be defined for the step, and
a user-selection device for initiating a forwarding of a step description for receipt by the application program, the step description created using the user input that defines the step name and the user input that defines the step type, and being configured consistently with the interface for the application program to create the step;
sending, by the maintenance tool and to the application program, the step description so as to cause the application program to add the step to the list of steps and display the added step, the step being defined according to the received user input that defines the step name and the type of step, the display of the step including a display of the step name that was defined by the user input.

15. The computer program product of claim 14, wherein the interface description restricts a form of the received user input.

16. The computer program product of claim 14, wherein the interface description restricts the received user input to step names or types of steps provided by the interface description.

17. A method for interfacing with an application program, the method comprising:
receiving, by a maintenance tool and from an application program that has an interface and that is configured to display a list of steps that are to be performed by a user of the application program, an interface description defining how to use the interface to input, into the application program, a step description that defines a step that is to be added to the list of steps,
wherein the interface description specifies that a step name and a type of step are to be defined for the step,
wherein the application program is included in an enterprise resource planning system or a module of an enterprise resource planning system;
generating, by the maintenance tool and using the interface description that was received from the application program, a screen that enables a user of the maintenance tool to define at least the step name and the type of step;
receiving, by the maintenance tool, user input that defines the step name and the type of step;
generating, by the maintenance tool and based at least in part on the received user input that defines the step name and the type of step, the step description; and
forwarding, by the maintenance tool, the step description for receipt by the application program so as to cause the application program to add the step to the list of steps and display the added step, the step being defined according to the received user input that defines the step name and the type of step, the display of the step including a display of the step name that was defined by the user input.

18. The method of claim 17, further comprising forwarding the received user input to the application program for comparison to a plurality of valid step names or types of steps, and in response receiving from the application program an indication of a validity of the received user input.

19. The method of claim 17, further comprising receiving a request by the user indicating that the step description is to be created for the application program, wherein the interface description is received in response to the request, and the request specifies the application program from a plurality of application programs that are capable of transmitting an interface description and receiving a forwarded step description configured consistently with the transmitted interface description.

20. The method of claim 17, wherein the interface description defines an interface field identifier, the step description includes an Extensible Markup Language (XML) tag that includes the interface field identifier, and the step description includes an XML field that corresponds to the XML tag and includes the definition.

21. The method of claim 17, further comprising receiving the interface description and forwarding the step description using a two-way interface.

* * * * *